United States Patent
Beauchesne et al.

(10) Patent No.: US 9,407,647 B2
(45) Date of Patent: Aug. 2, 2016

(54) METHOD AND SYSTEM FOR DETECTING EXTERNAL CONTROL OF COMPROMISED HOSTS

(71) Applicant: Vectra Networks, Inc., San Jose, CA (US)

(72) Inventors: Nicolas Beauchesne, Miami Beach, FL (US); Ryan James Prenger, Oakland, CA (US)

(73) Assignee: Vectra Networks, Inc., San Jose, CA (US)

( * ) Notice: Subject to any disclaimer, the term of this patent is extended or adjusted under 35 U.S.C. 154(b) by 0 days.

(21) Appl. No.: 14/644,177

(22) Filed: Mar. 10, 2015

(65) Prior Publication Data
US 2015/0264069 A1   Sep. 17, 2015

Related U.S. Application Data

(60) Provisional application No. 61/951,476, filed on Mar. 11, 2014.

(51) Int. Cl.
*H04L 29/06* (2006.01)
*H04L 12/24* (2006.01)

(52) U.S. Cl.
CPC ............ *H04L 63/1416* (2013.01); *H04L 41/06* (2013.01); *H04L 63/1425* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 2005/0050353 A1* | 3/2005 | Thiele ................... | G06F 21/554 726/4 |
| 2008/0028467 A1* | 1/2008 | Kommareddy ..... | H04L 63/1458 726/23 |
| 2009/0287920 A1 | 11/2009 | Fernandez et al. | |
| 2012/0023572 A1 | 1/2012 | Williams, Jr. et al. | |
| 2013/0117847 A1 | 5/2013 | Friedman et al. | |
| 2014/0032747 A1* | 1/2014 | Craddock ........... | H04L 63/1425 709/224 |

OTHER PUBLICATIONS

International Search Report & Written Opinion dated Jun. 15, 2015 for PCT Appln. No. PCT/US15/19798.

* cited by examiner

*Primary Examiner* — Andrew Nalven
*Assistant Examiner* — Khang Do
(74) *Attorney, Agent, or Firm* — Vista IP Law Group, LLP (57) ABSTRACT

A detection engine may be implemented by receiving network traffic and processing the traffic into one or more session datasets. Sessions not initiated by an internal host may be discarded. The frequency between the communication packets from the internal host to external host may be grouped or processed into rapid-exchange instances. The number of rapid-exchange instances, the time intervals between them, and/or the rhythm and directions of the initiation of the instances may be analyzed to determine that a human actor is manually controlling the external host. In some embodiments, when it is determined that only one human actor is involved, alarm data may be generated that indicates that a network intrusion involving manual remote control has occurred or is underway.

21 Claims, 11 Drawing Sheets

METHOD AND SYSTEM FOR DETECTING EXTERNAL CONTROL OF COMPROMISED HOSTS

CROSS-REFERENCE TO RELATED APPLICATION(S)

The present application claims the benefit of U.S. Provisional Application Ser. No. 61/951,476, filed on Mar. 11, 2014, titled "METHOD AND SYSTEM TO DETECT OUT-TO-IN INTRUSIONS ON A HOST", the content of the aforementioned application is hereby incorporated by reference in its entirety.

BACKGROUND

In recent years, it has become increasingly difficult to detect malicious activity on networks. The sophistication of intrusions has increased substantially, as entities with greater resources, such as organized crime and state actors, have directed resources towards developing new modes of intrusions.

For example, a common type of targeted cyber attack often begins with an outside attacker coaxing a target (e.g., an individual or an employee of an organization/company) to perform an action on a computer that will infect the employee's host computer. Such actions may include, for example, clicking a web link at a malicious web site or opening an email attachment which contains an infected file. In this way, an outside attacking entity, which created the malicious link or email attachment, can effectively gain control and breach a user's computer without attempting to penetrate traditional security defenses, such as a firewall.

Once the user's computer has been breached, it can be used by the outside attacker as platform for launching deeper attacks on the organization's network and/or servers. One of the common progressions of this type of attack is that the external attacker takes remote control of the user's host (e.g. computer) and manually directs reconnaissance and attack activities from out-to-in.

Clearly, a serious violation of computer security occurs when an external attacker takes manual control of a host inside an organization's network. As such, there is a great need for approaches that effectively and efficiently identify these types of attacks.

SUMMARY

The disclosed embodiments provide improved approaches for detecting out-to-in control of a compromised host. In particular, the present disclosure describes a system, method, and computer program product that can detect when an external attacker takes manual control of a host inside a company or organization's network. In some embodiments, a detection system may be employed that analyzes network traffic on the inside of a network's firewall. The detection system may detect an internal host establishing a connection to an external host, which effectively instructs the organization's firewall to allow traffic to flow in both directions. The external host would then exert remote manual control over the internal host—effectively controlling the host in the opposite direction in which the connection was established.

Other additional objects, features, and advantages of the invention are described in the detailed description, figures, and claims.

DETAILED DESCRIPTION

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Before describing the examples illustratively depicted in the several figures, a general introduction is provided to further understanding.

In some embodiments, a remote control detection engine detects network attacks carried out or performed by an external host by receiving network traffic and processing the traffic into session datasets. Sessions not initiated by an internal host may be discarded. The frequency between the communications from the internal host to external host may be grouped or processed into rapid-exchange instances (represented by packet transmissions). The number of rapid-exchange instances, the time intervals between them, and/or the rhythm and directions of the instances may be analyzed to determine that a human actor is manually controlling the internal host. In some embodiments, when it is determined that two human actors are participating (e.g. two or more humans), the session may be ignored; as it may correspond to innocuous network traffic such as a chat-related session. In some embodiments, when it is determined that only one human actor is involved and that human actor is outside the network, alarm data may be generated that indicates that a network intrusion has occurred or is underway.

Figure 1A:
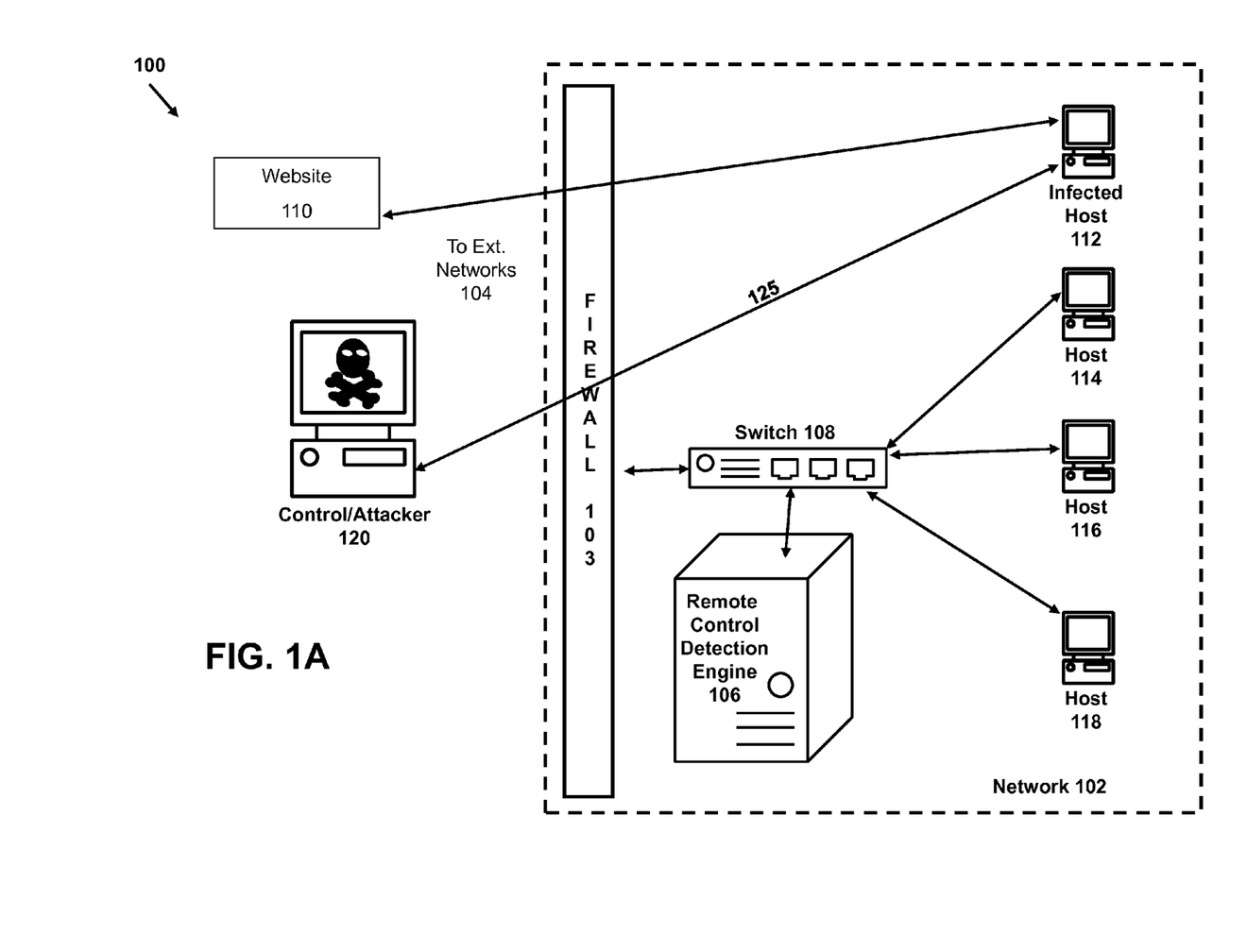
FIG. 1A-B illustrates an example environment in which a remote control detection engine may be implemented to perform detection of remote control of an organization's hosts by an external attacker, as according to some embodiments.

FIG. 1A illustrates an example environment 100 in which a remote control detection engine 106 may be implemented to perform detection of remote control network intrusions, as according to some embodiments. There, an example network 102 environment comprises one or more hosts (e.g. assets, clients, computing entities), such as host entities 112, 114, 116, and 118, that may communicate with one another through one or more network devices, such as a network switch 108. The network 102 may communicate with external networks 104 through one or more network border devices as are known in the art, such as a firewall 103. For instance, host 112 may contact external website 110 through network protocols such as TCP/IP, involving HTTP requests and responses. Thus, as illustrated in this example, the hosts may be inside the protective perimeter of network 102.

In some embodiments, the remote control detection engine 106 enables network traffic to be analyzed, parsed into session datasets, and behavior (e.g. pattern) detection analysis performed on hosts in the network 102. In some embodiments, as illustrated, the remote control detection engine 106 may tap (e.g. TAP/SPAN) the network switch 108 to passively analyze the network traffic in a way that does not harm or slow down the network (e.g. by creating a copy of the network traffic for analysis). In some embodiments, the remote control detection engine is an external module that is coupled to the switch 108. While in some embodiments, the out-to-in detection engine may be directly integrated into network components, such as a switch 108 or a firewall 103. While still, in some embodiments the remote control detection engine may be integrated into one or more hosts (e.g. 118) in a distributed fashion (e.g. each host may have its own set instructions, the hosts collectively agree to follow or adhere to the instruction to collect information and report information to one another or the database to collectively work as a detection engine). Still in some embodiments, the remote control detection engine may be integrated into a single host (e.g. host 112) that performs remote control detection actions for the network 102.

The company network 102 may also include one or more infected hosts, e.g. host 112. Typically, the infected hosts are running software installed without the direct knowledge of the end user of the host or the IT organization for the company that owns both the network and the machine connected to it. In some embodiments, different forms of infection (e.g. infections from network attack), such as viruses, trojans, or worms, that infect the hosts display different types of activity patterns. As described in further detail below, the remote control detection engine 106 can be tuned using detection schemes to detect remote control behavior by an external attacker of an infected host. As one of ordinary skill in the art appreciates, the manner in which the host became infected (e.g., phishing, watering hole, search engine poisoning, etc.) is not limiting as to the solution described herein. In this way, a detection scheme can be implemented that is flexible and adaptable to different network attacks and infections.

In some embodiments, an attacking entity 120 may make the infected host perform activities not known or desired by the company that owns the infected host 112. For instance, as explained below, an attacking entity 120 may trigger a remote connection (e.g. connection 125) initiated by the host 112, which the attacking entity may use to control the host 112.

As mentioned, in some embodiments the company network is protected by a firewall 103 that generally prevents external hosts (e.g. a computer associated with website 110) from being able to initiate connections to hosts in the company network (e.g. an initial communication from website 110 to host 112 is forbidden/stopped by firewall 103). However, border security devices such as the firewall 103 do not typically prevent internal hosts from connecting to external systems using approved protocols such as HTTP (HyperText Transfer Protocol) and DNS (Domain Name System). That is, while a firewall attempts to prevent an external attacker from directly infecting a host inside the company network, if the internal host can be coaxed into contacting an external system, the firewall will not prevent the response from the external system from infecting the internal host. In some embodiments, in campus networks for instance, the firewall may also implement NAT (Network Address Translation) functionality that hides the internal IP address of a host when it is communicating with outside systems.

However, the present embodiments provide approaches that address the problem of detecting attacks involving remote control being exerted over an infected host. In some embodiments, the remote control detection engine 106 in the company network will detect that a network intrusion is underway (or has already occurred) by observing the traffic from internal hosts to the external networks and external entities (e.g. control/attacker 120). The detection system can be located in the company network in such a way that it sees the host traffic to the Internet and sees that traffic before NAT changes the internal IP addresses of each internal host's traffic.

Figure 1B:
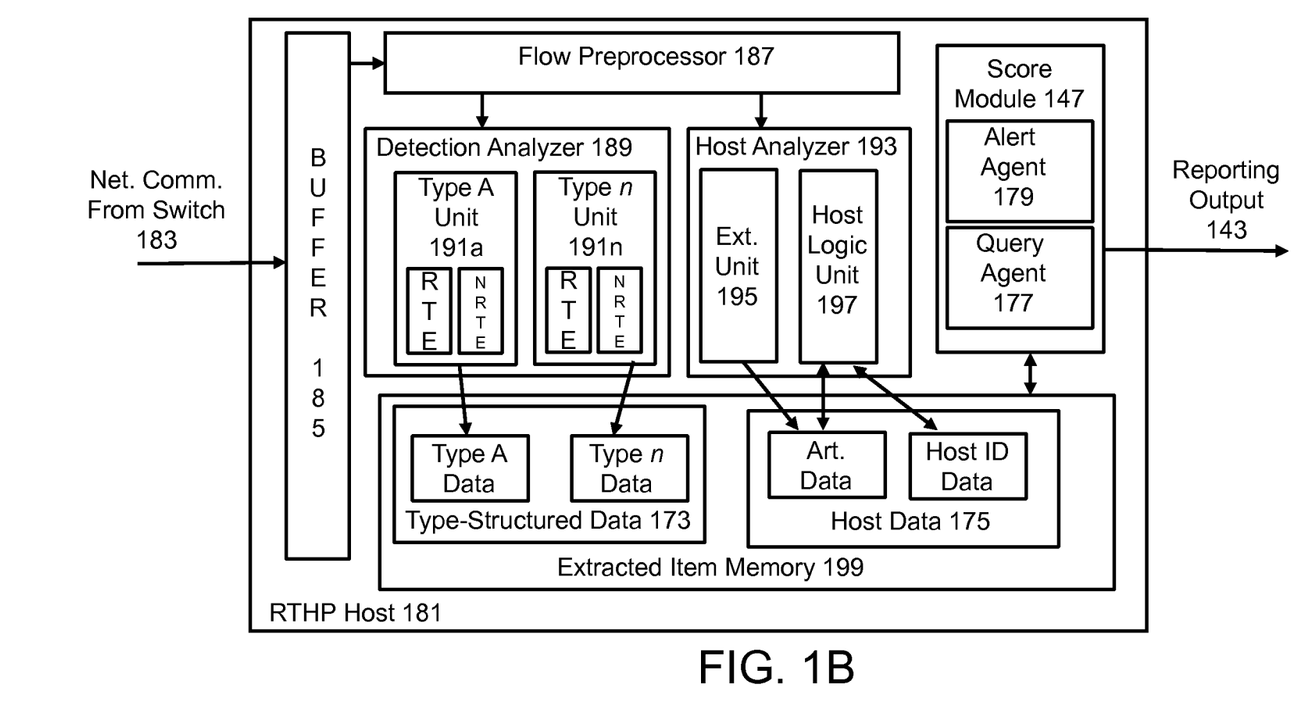

FIG. 1B illustrates an example system in which the approaches disclosed may be implemented. FIG. 1B shows internal aspects of a real-time historical perspective engine (RTHP) 181. At 183, network communications from a switch may be received by RTHP 181 and loaded into a buffer (e.g. rolling buffer) memory structure 185. A flow preprocessor 187 can parse the network traffic using one or more parsing units (not depicted), each of which may be tuned to parse different types of network traffic (e.g. HTTP, TCP). In some embodiments, the flow preprocessor 187 generates session datasets that correspond to communications between two hosts (e.g. between two hosts inside a network or between an external host/entity and an internal host).

The session datasets may be analyzed by a detection analyzer 189, which detects different types of threats or analysis data, and a host analyzer 193, which analyzes the hosts which generated the network traffic. In some embodiments, the detection analyzer 189 and host analyzer 193 may extract one or more data items and store them in an extracted item memory 199.

In particular, the session datasets may be analyzed by a detection analyzer unit 189, which may comprise one or more detection units 191a-191n. In some embodiments, the detection units may contain a real time analysis engine ("RTE") which can identify threats without collecting past data (e.g. accumulating state) and a non-real-time analysis engine ("NRTE"), which generally accumulates data about network events that appear benign, but accumulate to significant threat levels (e.g. DDoS attacks).

In some embodiments, the detection units are customized to analyze the session datasets and extract type-specific data that corresponds to various network threats, attacks, or analysis parameters. For example, detection unit Type A 191a may be designed for detecting relay communication attacks; for every type of relay communication detected, detection unit Type A 191a may store the detection in "Type A" structured data. As a further example, detection unit Type n 191n may be designed to detect bot activity, such that every time a computer or host in the network performs bot-related activities, detection unit Type n may store detection-related data in "Type n" structured data. In some embodiments, the detection data per unit may be stored in a type-structured data 173 portion of memory, which may be partitioned from extracted item memory 199.

In some embodiments, the host analyzer 193 comprises an extraction unit 195 and a host logic unit 197. The extraction unit 195 is designed to extract artifacts or identification data (e.g. MAC address, IP address), which may be used to identify a host, and store the extracted data in an artifact data store ("Art. Data") in host data 175. The host logic unit 197 may analyze the extracted artifact data and generate host ID data (e.g. durable host IDs).

In some embodiments, a score module 147 may be implemented to analyze the extracted item memory 199, score the detections in the type-structured data 173, and correlate the detections with host ID data. In some embodiments, the score module 147 can run checks on the type-structured data to determine if any thresholds have been exceeded. In some embodiments, the score module may edit or update the host ID data (e.g. in host data 175) with new detection information. For instance, the score module may correlate newly detected bit-coin mining activity to an existing host ID and update the host ID with further information regarding the recent bit-coin activity. In some embodiments, the score module 147 further comprises an alert agent 179 which can generate alert data if a network attack threshold is exceeded. In some embodiments, the score module 147 comprises a query agent 177 which can retrieve data from the extracted item memory 199 in response to network security administrators or other network security devices. In some embodiments, the score module may generate the alert data or query responses as reporting output 143.

Further details of an example system are described in U.S. patent application Ser. No. 14/643,931, entitled "A system and method for detecting intrusions through real-time processing of traffic with extensive historical perspective", filed on even date herewith, which is hereby incorporated by reference in its entirety.

Figure 2:
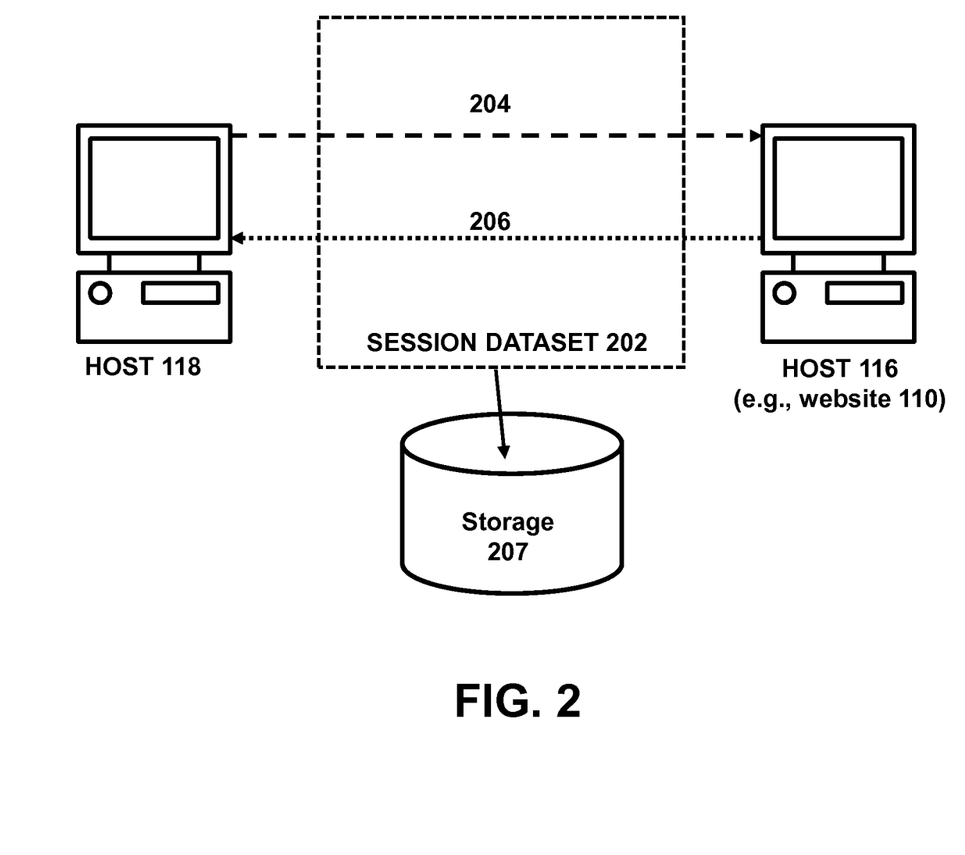
FIG. 2 illustrates a session dataset comprising one or more unidirectional flows between two computing entities, as according to some embodiments.

FIG. 2 illustrates a session dataset comprising one or more unidirectional flows between two computing entities, as according to some embodiments. As mentioned, in some embodiments the remote control detection engine 106 may perform intrusion detection on network communications in a passive manner that does not slow down or harm network throughput. In one embodiment, the remote control detection engine taps a network switch and copies the network data as received network traffic for analysis. In some embodiments, the network communication flows between hosts inside or outside the network (e.g. received network traffic) are parsed into session datasets which may be stored as flow data structure for analysis. For example, as shown in FIG. 2, host 118 is communicating with host 116. First, host 118 generates a first communication flow dataset 204 (e.g. request, unidirectional data flow). Second, host 116 generates a second communication flow dataset 206 (e.g. response, unidirectional data flow). In some embodiments, by examining packet contents (e.g. data/information transmitted in the unidirectional data flows), such as source and destination addresses, the remote control detection engine 106 may combine matching flows into a session dataset 202. However, in some cases, a request (e.g. 204) is sent, but there is no reply (e.g. 206 does not occur). This may be because host 118 addressed its communications to a non-existent target, for example. Nonetheless, this communication may still be categorized a session dataset by the remote control detection engine 106. After identifying and categorizing one or more flows into a session dataset (e.g. 202), the remote control detection engine 106 may store the session data, unidirectional flow data, and other data, such as session identifying data, in a storage device 207.

In some embodiments, the remote control detection engine 106 protects against network intrusions where an attacker is connected to an external controlling host 120 that establishes a manual (e.g. remote access) control over the host inside the customer network 102. For instance, assume a control/attacking entity 120 (e.g. a human attacker, bot) sends a malicious payload (e.g. virus, Trojan, worm, malicious script) to host 112 through a side-channel (e.g. malicious email attachment). The malicious payload when run (e.g. interpreted, executed) may instruct the host 112 to establish an initial connection with the control/attacking entity 120. Normally, inward bound initial communications are blocked by the firewall. However, as viewed by the firewall, the communication was initiated from the inside, by the internal host to the external host 120; as such, the firewall may allow such a communication. In this way, the attacking entity can "poke" a hole in the firewall protecting the network 102.

After the hole is poked through the firewall in the out-to-in direction (e.g. the first communication is initiated in the "out"-ward direction from the network, thereby creating a hole which can allow malicious attacks "in" through the firewall) the control/attacker 120 may then take over the connection 125 and become the prime driver of activity on the connection to the internal host 112. In this way, an attacker (e.g. human attacker) connected to the external controlling host (e.g. 120) is now able to perform manual work on the internal host 112 through the connection 125.

In some embodiments, as mentioned, such remote control (e.g. communication 125) may occur through the use of remote control software installed on the host (e.g. an infected host). In most cases, the remote control software is installed on the host without the end user of the host or the IT organization that runs the company network intentionally installing the software. In some cases, the software is intentionally installed by the IT organization but is being used to grant control without the express intent of the end user (e.g. an intentionally installed program implementing non-user-granted permissions).

Figure 3:
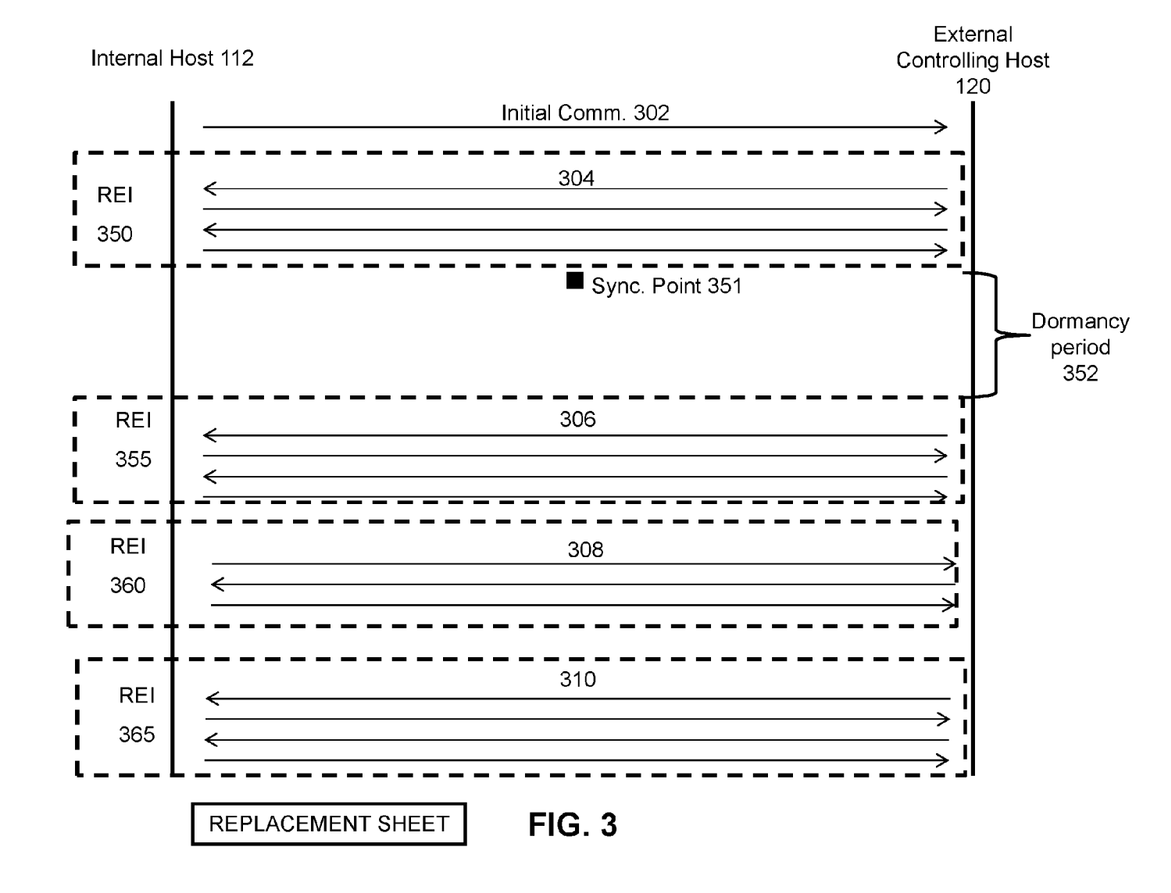
FIG. 3 shows an example of communications patterns that may be used to detect remote control of a compromised host, as according to some embodiments.

In some embodiments, the remote control detection engine 106 detects attacks involving manual remote control of an internal host by an external host by examining communication data and flagging suspicious communications patterns. FIG. 3 shows an example of communication patterns that may be used to detect this type of manual remote control, as according to some embodiments. At 302, the software on the internal host contacts the external controlling host at a specified IP address. As explained, the communication at 302 may be seen by the firewall 103 as the first communication between host 112 and host 120, though one or ordinary skill in the art appreciates that host 120 could have effectively first communicated with the host 112 through other channels (e.g. email attachments) to initially infect the host.

In some embodiments, the IP address of the external controlling host 120 may be integrated into the remote control software (e.g. infecting/malicious software) on the internal host, which may be delivered via out-of-band "command and control" channel, side-channels, and/or may be looked up via DNS (Domain Name Service), for example. Because the connection originates from inside the network (e.g. a trusted side), the network firewall allows the malicious network communications between the infected host and the attacking entity.

At 304, the external controlling host 120 initiates a series of communications with the infected host 112. While FIG. 3 illustrates two round trips of exchanges between the two hosts, one of ordinary skill in the art appreciates that in some instances, more than two round trips may be required for an initial exchange to conclude. In some embodiments, series of communications that occur between the two hosts with relatively no intervening gap of communication (e.g., silent period in the network) that exceeds a small threshold may be labeled as a rapid-exchange instance (REI) 350. In some embodiments, the intervening gap may be as little as one second, though it could be more based factors such as speed of network, type of remote control software used. Accordingly, a gap parameter that sets the small threshold may be adjusted per network implementation so that the series of communications may be grouped into REIs.

In some embodiments, the remote control detection engine 106 may identify and label rapid-exchange instances 350 as REI data, which may be used for further analysis as described below. In some embodiments, an initial rapid-exchange instance (e.g. 350) concludes when the remote control session has exchanged what the external attacker (or control software) needs to reach a point of synchronization 351 between internal host and external controlling host. In some embodiments, once the point of synchronization 351 occurs, the infected host 112 may remain silent or dormant (with respect to the malicious communications with the attacker 120), and may wait for the next action or signal from the external attacker for what to perform next. The silence period may be labeled and stored as data as a dormancy period 352.

In some embodiments, in the majority of rapid-exchange instances, more data flows from the internal host 112 to the external controlling host 120 than vice versa. In some cases, this may be a result from the remote controller (e.g. attacking entity 120) sending small sets of keyboard input and/or mouse movements to internal host 112 (e.g. sending keyboard inputs and/or mouse movements to the internal/infected host to indicate actions it should perform locally) and the internal host 112 sending larger updates—which may include screen updates (e.g. screen-shot data), command outputs (e.g. results of a command to scan the internal network 102 and return results), and stolen files—to the external controlling host 120 in response. In some embodiments, a data direction size threshold or ratio (e.g. a direction threshold) may be set that indicates how much data is going out versus in (e.g. the data amount going from host 112 to external host 120 versus the data amount going from external host 120 to internal host 112) such that if the ratio is exceeded or surpassed, the detection engine considers it possible that the exchange may be a malicious remote control connection.

In some embodiments, the remote control channel 125 may be used to transfer new software from the external controlling host to the internal host to expand the offensive capabilities of the internal host (for subsequent use by the external attacker). As such, in some cases, one or more rapid-exchange instances could involve more data going from the external entity to internal entity, than going from the internal entity to external entity. In some embodiments, the direction in which more data is flowing may correspond to a rapid-exchange instance vector, which may be stored as a flag or data value. For instance, if more data is being sent from the internal host to the external attacker an "outward" vector or flag may be stored as a data value to label the communications for analysis. Similarly, if more data is flowing from the external attacker to the internal host an "inward" vector may be stored as a data value to label the communications for analysis.

At 306, after a variable period of silence or dormancy period 352 (which in some cases may occur due to the attacker attached to the external controlling host digesting/analyzing the results returned from the internal host) is observed, the external controlling host 120 may send another set of instructions 306 to the internal host 112, resulting in one or more new rapid-exchange instances (e.g. 360, 365). In some cases, the dormancy period varies. The detection system 106 may analyze the period silence duration(s) (e.g. dormancy period 352 values) to determine whether a human is involved on the attacking entity side. For instance, once initial REI data 350, with results from the internal host, is analyzed by a human attacking entity, the human attacking entity may then decide how to proceed and send the next steps for the internal infected host to perform; however as the initial REI result data 350 took time for the human attacker digest/analyze, an unintentional period of silence may arise which can be detected (e.g. as a break in cadence or change in dormancy period frequency/amounts) and labeled as a dormancy period 352. In some embodiments, the initiating entity of a rapid-exchange instance may be stored as a data value (e.g. an initial communication data flag) that may be used for later analysis. Further, in some embodiments, the initiating entity of a rapid-exchange instance that immediately follows a period of silence may be stored as a data value (e.g. an initial communication data flag) so that the detection system may determine that a human entity is involved or initiated the REI. For example, a period of silence may be broken by the external controlling entity 120 host (see 306 first arrow direction) rather than the internal host that originally established the connection through the firewall (see 302 arrow direction). In some embodiments, the remote control detection engine 106 concludes that an attack involving external manual remote control has occurred or is underway when an initial communication 302 is in the outward directed, followed by a inward (e.g. 304) based REI 350, followed by a dormancy period 352, followed by one or more follow-up REIs, where the leading communication is usually inward directed (e.g. 306). In this way, by detecting periods of silence (e.g. 352) and directions of initiating communications (e.g. 302 and 306), the detection system 106 can determine from the pattern of communications whether an irregularity in machine communications may likely to have been caused by a single human intervener.

In some embodiments, as illustrated at 308, the internal host 112 breaks the variable period of network silence by starting a communication with the external entity. This may occur for instance when the human attached to the external controlling host initiates a task on the internal host that takes some time (e.g. several seconds or minutes) to complete before returning results. In these example cases, the internal host 112 will initiate the new rapid-exchange instance 360 when it has completed its task and is trying to return result data (e.g. reconnaissance data). In some cases, internal host 112 initiated REIs may be relatively rare, as compared to all REIs observed in a remote control session (e.g. 302 to the last arrow in 365). In some embodiments, the ratio of external initiated REIs to internal initiated REIs may be stored as a data value and/or analyzed to determine that a human actor is not involved (e.g. vindicate the suspicious network data). For instance, if the same number of internal host initiated REIs and external initiated REIs occur it may evidence a machine communication cadence, or may evidence a chat session (e.g. communication session) between two humans. However, if more external initiated REIs occur than internal initiated REIs, it may evidence a control situation where the internal host 112 is merely acting as a slave or remote computer for the external controlling host 120.

In some embodiments, the scenario wherein the internal host initiates a REI (e.g. 308) is a temporary break in the general pattern of scenarios wherein the external controlling host starts the REI (e.g. 304, 306, 310). For example, a number of network packets are observed traveling in both directions and the traffic between the two hosts falls silent again. The remote control session then resumes the previous pattern, with the external controlling host once again initiating communication, for instance 310, after a variable period of silence. In some embodiments, an REI initiator threshold ratio may be set between internal initiated REIs and external initiated REIs (e.g. as indicated by one or more initial communication data flags) such that if the ratio is exceeded or surpassed alarm data may be generated that indicates that a manual remote control network intrusion is occurring.

In some embodiments, the remote control connection 125 includes a minimum number of rapid-exchange interfaces (e.g. 350, 355, 360) in order for the remote control detection system 106 to have sufficient data to determine that the exchange 125 is a remote control connection initiated from inside the network to the outside, but with the human controlling the connection on the outside of the network (e.g. effectively an out-to-in network intrusion). In some embodiments, if a first communication 302 is initiated by the internal host, a first REI occurs 350, a relatively large dormancy period 352 occurs (e.g. as indicated by dormancy period data) followed by a plurality of additional REIs 355, 360, 365, the remote control detection system 106 triggers alert data that an intrusion involving manual remote control is likely underway.

Figure 4:
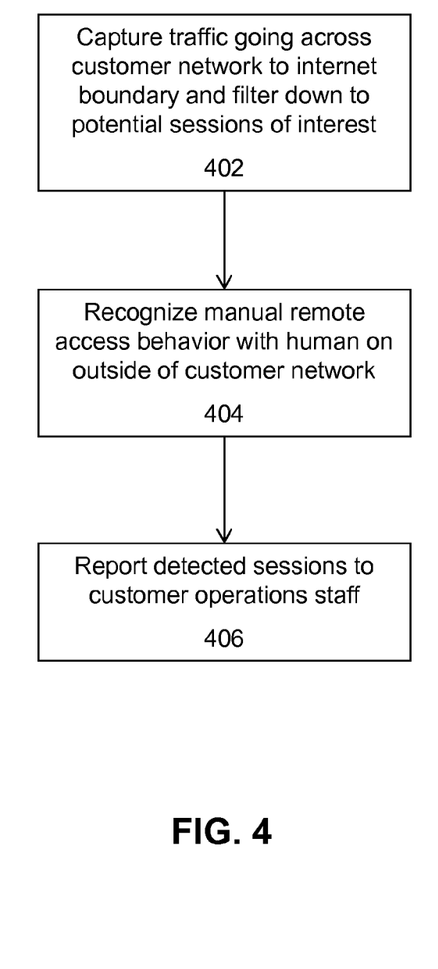
FIG. 4 shows a high level flowchart of an approach for the remote control detection system, as according to some embodiments.

FIG. 4 shows a high level flowchart of an approach for the remote control detection system, as according to some embodiments. At 402, the detection system captures a copy of network traffic, generates session data, and filters the traffic to be considered of interest for more detailed analysis. For example, the filtering may identify the sessions that meet the basic criteria (e.g. internal host initiates the connection) of remote control connections that should be detected.

At 404, for the network traffic that has been selected for analysis, the detection system organizes the traffic flows and applies one or more pattern recognition schemes to the traffic, as explained above. In some embodiments, the pattern recognition schemes may be statistically based. At 406, for sessions that meet the detection criteria, the detection system 106 reports information about the session (e.g., when it started, when it ended, how much traffic was sent in each direction, identity of the internal host involved, IP address of the external controlling host). This information can be reported (e.g., to the customer security operations staff) via a number of alerting mechanisms (e.g., user interface for the detection system, e-mail, syslog).

Figure 5:
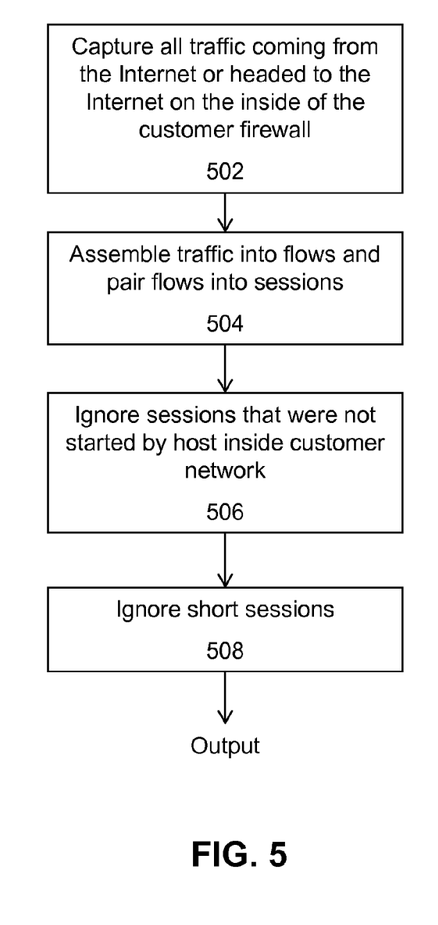
FIG. 5 illustrates an approach for performing packet capture and filtering, as according to some embodiments.

FIG. 5 illustrates an approach for performing packet capture and filtering, as according to some embodiments. The detection system may operate by obtaining copies of traffic of interest (e.g., any traffic to or from the Internet) and filters for the traffic that has the potential to be the type of remote control session that it should detect, as explained above. At 502, network packets may be received on one or more network interfaces that connect the detection system to the customer network. In some embodiments, duplicate packets can be found and discarded.

At 504, the surviving packets are assigned to flows. In some embodiments, depending on the protocols in use, the flow entry may be identified by a five-tuple (source IP, destination IP, protocol identifier, source port, destination port) for UDP and TCP or a triple (source IP, destination IP, protocol identifier) for other protocols. In some embodiments, flows are unidirectional with two flows traveling the same path in opposite directions being considered a session.

In some embodiments, packets may arrive out of order due to queuing issues in routers or due to the availability of multiple paths between source and destination. In such cases, the detection system 106 may place the packets in the order originally transmitted by the originating host of the flow. At 506, sessions that are not initiated from an inside host to an outside IP address are then discarded.

At 508, the length of a session may be considered before determining that further processing should be performed. In some embodiments, sessions that are active for a span of time below a threshold may be discarded. In some embodiments, sessions that involve too little network traffic from internal hosts to external hosts are discarded. In some embodiments, sessions that involve too little network traffic in the other direction are also discarded.

Figure 6:
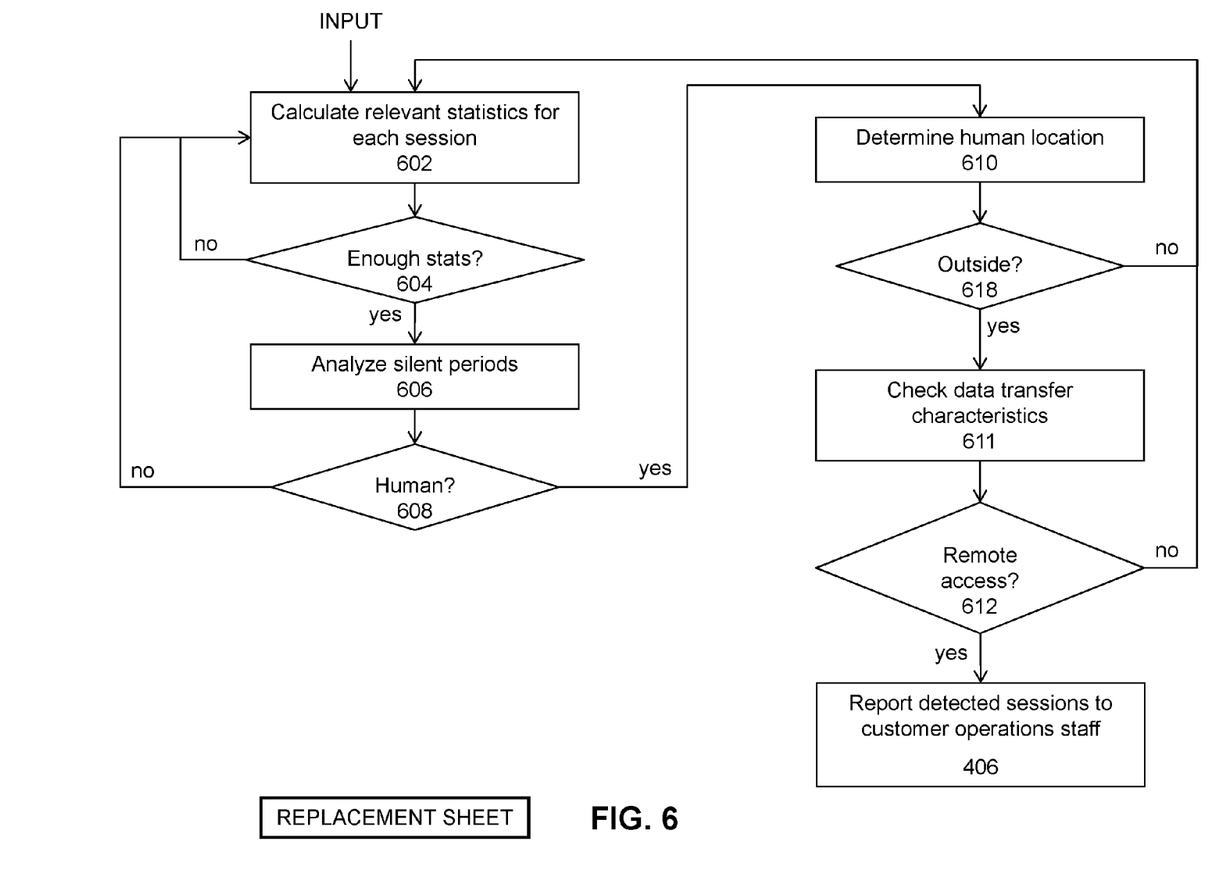
FIG. 6 shows a flowchart for an approach for implementing remote control detection, as according to some embodiments.

FIG. 6 shows a flowchart for an approach for implementing remote control detection. In some embodiments, only sessions which were initiated from an inside host (e.g. 112) to an outside IP address and that have met time length and traffic volume criteria enter the detection process illustrated in FIG. 6 as inputs.

In some embodiments, the system begins at 602 by calculating relevant statistics for the session being considered. In this part of the system, packets traveling in both directions on the session are placed into rapid-exchange instances, with statistics on the number of packets sent in each direction during the REI to be accumulated. In addition, statistics may are gathered on the number of bytes sent and received in each direction during the REI. Finally, the length of the silences between the REI may be determined and accumulated (e.g. stored for analysis).

As according to some embodiments, at 604, if the session has not reached a threshold with respect to number of REIs and amount of data transfer, no more processing is performed and the process loops back to 602 to gather more statistics.

In some embodiments, if sufficient statistics have been gathered, then at 606 the accumulated periods of silence between REIs may be considered and analyzed. In some implementations, the analysis is performed to identify, for example, relatively regular occurrence and length of periods of silence, which may be indicative of a high likelihood of software-driven behavior involving no manual human interaction.

If at 608 the session appears to be software-driven, the system ignores it for now, although the system may continue to gather statistics on the session in case the communications patterns shifts from indications of software-driven to human mode.

If, however, the session appears to be human-driven, then the processing may continue to 610. At 610, the system may determine how many human actors/interveners are involved and where the humans are located in relation to the internal host (e.g. 112) and the external host involved in the session. If there is more than one human involved (e.g., an instant messaging session involving two or more individuals), then the session may currently not be of interest, though the system will continue to gather statistics on the session in case it shifts to single human mode.

At 618, the system determines whether the single human driving the session is on the inside of the customer network or on the outside of the network. Sessions with the human on the inside of the network are ignored, though the system may continue to gather statistics on the session in case it shifts to outside human control.

At 612, the system may determine whether the traffic pattern is consistent with that of a remote control session. In some embodiments this determination is performed by examining the data transfer characteristics at 611 of individual REIs. In some embodiments, this determination is performed by examining the data transfer characteristics at 611 of individual REIs while also analyzing the cumulative characteristics across the REIs in a session. A session whose data transfer characteristics are not consistent with remote control patterns is ignored, though the system will continue to gather statistics on the session in case it shifts to a remote control pattern. At 406, session datasets passing the above determinations may be reported to the security operations staff.

Figure 7:
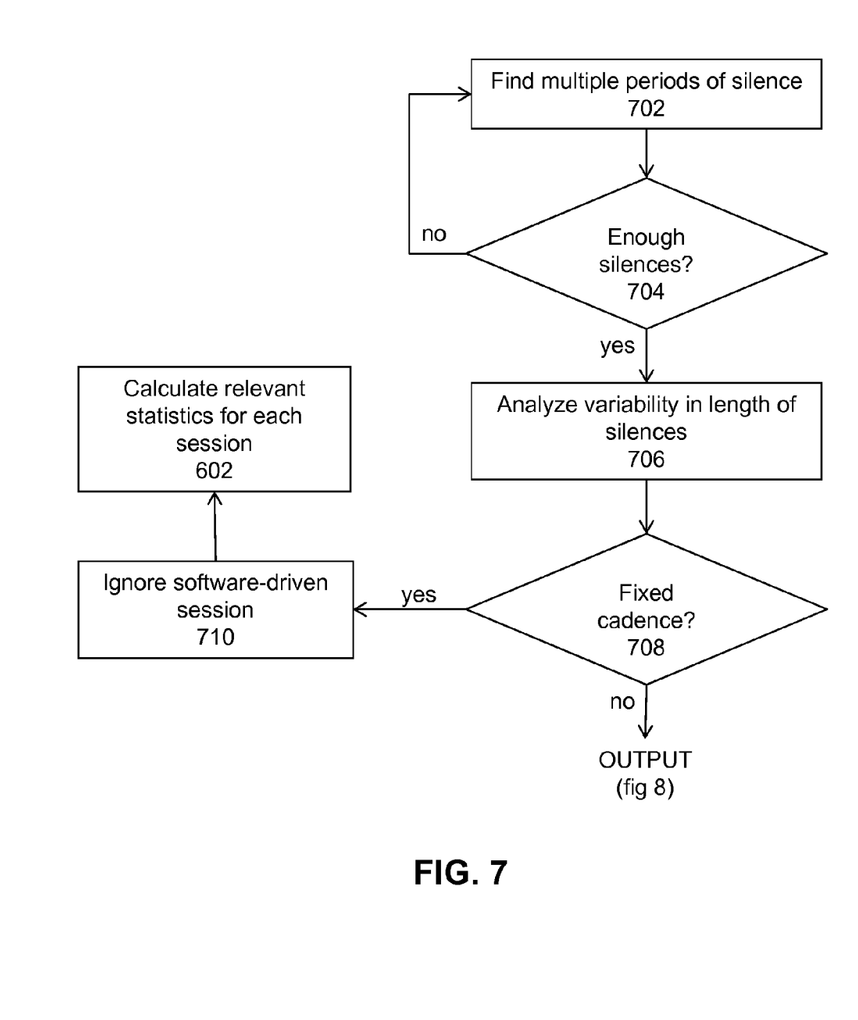
FIG. 7 illustrates an approach for determining whether the session is software-driven or human-driven.

FIG. 7 illustrates an approach for determining whether the session is software-driven or human-driven. In some embodiments, determining whether a session is software-driven or involves one or more humans may involve analyzing patterns of silences between REIs. At 702, the system may accumulate data about the length and spacing of the silent periods between the session's REIs (e.g. dormancy periods). At 704, a determination may be made whether a sufficient amount of the silent period data has been accumulated. One or more thresholds may be established to determine the minimum amount of needed for continuing the analysis.

At 706, once sufficient data about silences between REIs is accumulated, the system may analyze the variability in the spacing of start times of the silences, the variability in the length of the silences and the variability in the end time of the silences. At 708, if there are patterns that indicate a fixed cadence (e.g. consistent flow, periodic flows, uniform regularity), then the session may be determined to be software-driven and is ignored at 710; although, as noted previously, the system may continue to analyze the session to detect a software-driven session that subsequently transition to human control based sessions. Examples of signs of fixed cadences include the start time of the silences being spaced at fixed intervals (plus/minus some small delta), the end times of the silences being spaced at fixed intervals (plus/minus some small delta) or the length of the silences being the same (plus/minus some small delta). After 710, the system may continue to calculate relevant statistics for each session at 602.

Figure 8:
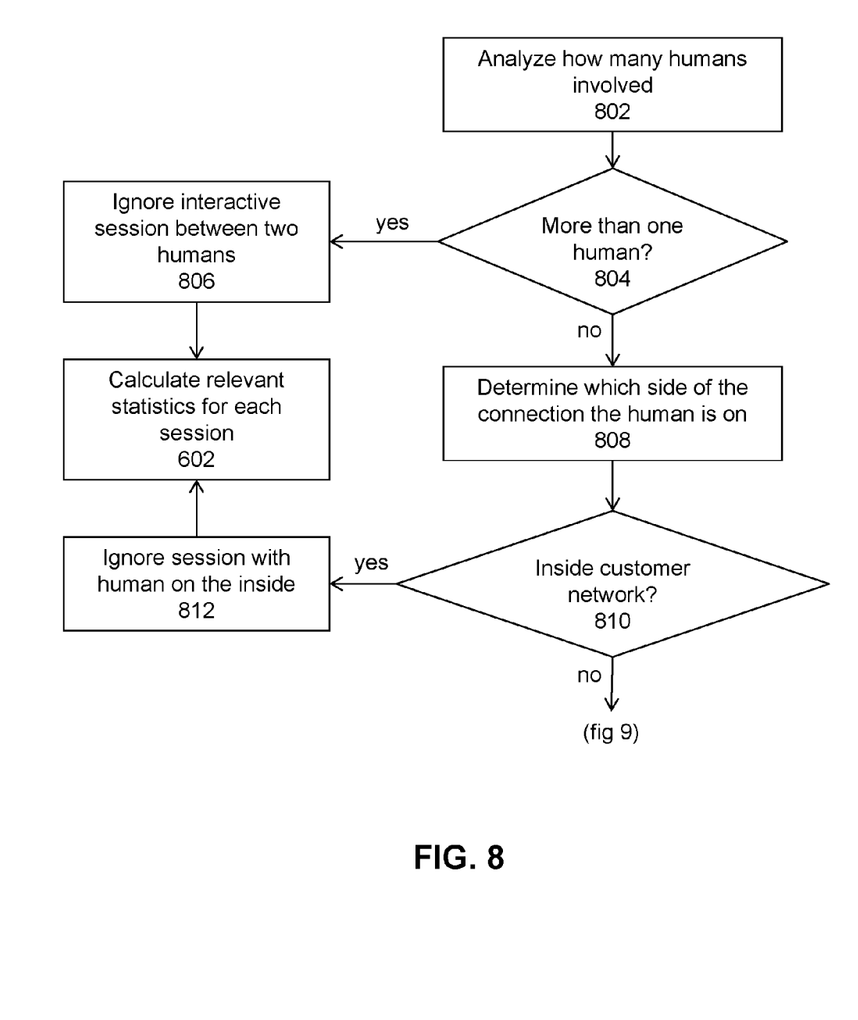
FIG. 8 illustrates an approach that can be taken to perform human actor detections, as according to some embodiments.

In some embodiments, once the system determines that at least one human is involved, it may filter down sessions involving a single human where that human is attached to the external host rather than the internal host. FIG. 8 illustrates an approach that can be taken to perform these detections, as according to some embodiments. At 802, to analyze whether more than one human is involved, the system may consider a percentage of REIs that are initiated by each of the two hosts for the session. In some cases, at 804, if the percentage of REIs started by one of the parties is over a relatively high threshold, the system may conclude that a single human is involved in the session. If the percentages for which host starts a REI are more balanced (e.g. 60% for one and 40% for the other), the system may conclude that there is a human on both ends of the connection and it may ignore the session at 806; though as mentioned, the system may continue to analyze the session to detect a session involving two humans which subsequently transitions to a single human driving the session. After 806, the system may continue to calculate relevant statistics for each session at 602.

For sessions involving a single human, the system may consider which host the human is logically attached to at 808. If the host that starts new REIs most of the time is the internal host 810, the session is ignored 812, though the system may continue to analyze the session to detect a session involving a human on the inside of the customer network which subsequently transitions to a human controlling the session from the outside of the customer network. After 810, the system may continue to calculate relevant statistics for each session at 602.

Figure 9:
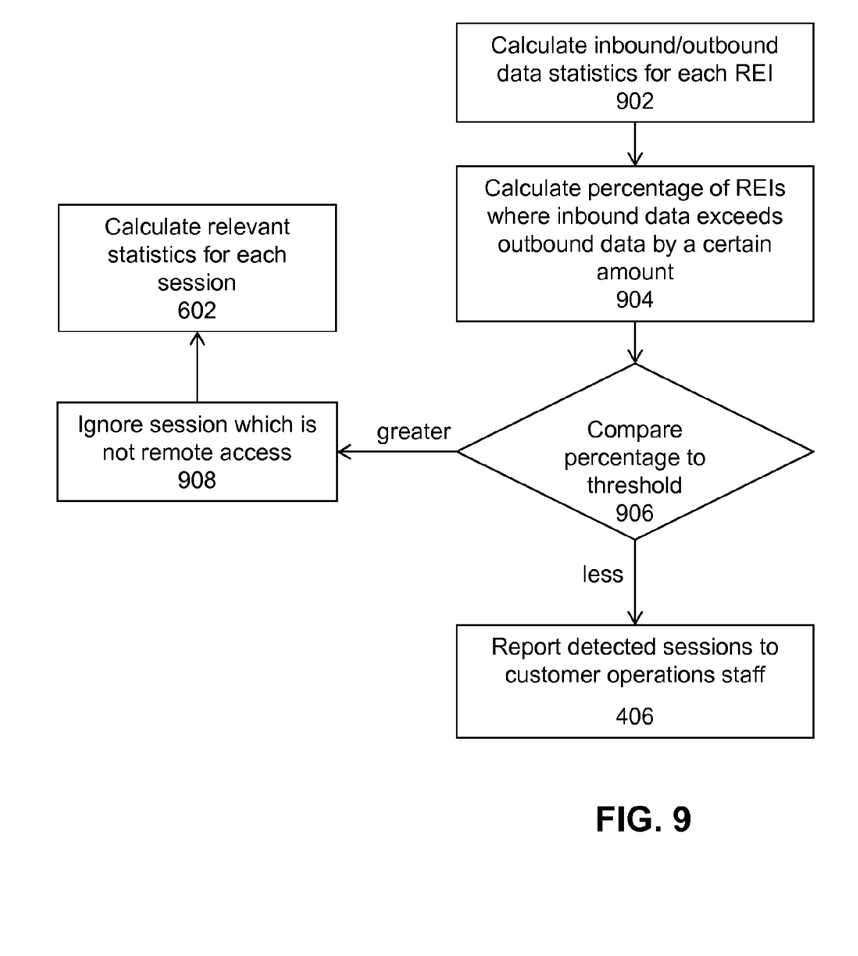
FIG. 9 illustrates an approach that can be taken to perform remote control intrusion analysis, as according to some embodiments.

In some embodiments, sessions that are deemed to be under control of a single human with that human being outside the customer network continue to further processing. The final detection step consists of deciding whether the data transfer pattern of the session is consistent with the pattern expected for remote control. FIG. 9 illustrates an approach that can be taken to perform this type of analysis, as according to some embodiments. At 902, the system may calculate statistics for the data transfer pattern of each REI in the session. At 904, the system may determine the percentage of REIs in which the inbound data (data from external host to internal host) exceeds the outbound data (data from internal host to external host) by a certain amount (the amount may be expressed in absolute terms or in percentage terms or some combination of the two). At 906, if the percentage of REIs exceed a threshold, the data flow may be considered in the wrong direction and the session may be ignored at 908; though the system may continue to analyze the session to detect a session that appears not to be doing remote control that subsequently transitions to a remote control pattern. After 908, the system may continue to calculate relevant statistics for each session at 602.

Sessions which appear to have a pattern consistent with remote control are reported to the customer's security operations staff as signs of an external attacker having taken over manual control of an internal host.

Therefore, what has been described is an improved system, method, and computer program product for performing intrusion detections which involve manual control of an internal host by a human outside the network.

SYSTEM ARCHITECTURE OVERVIEW

Figure 10:
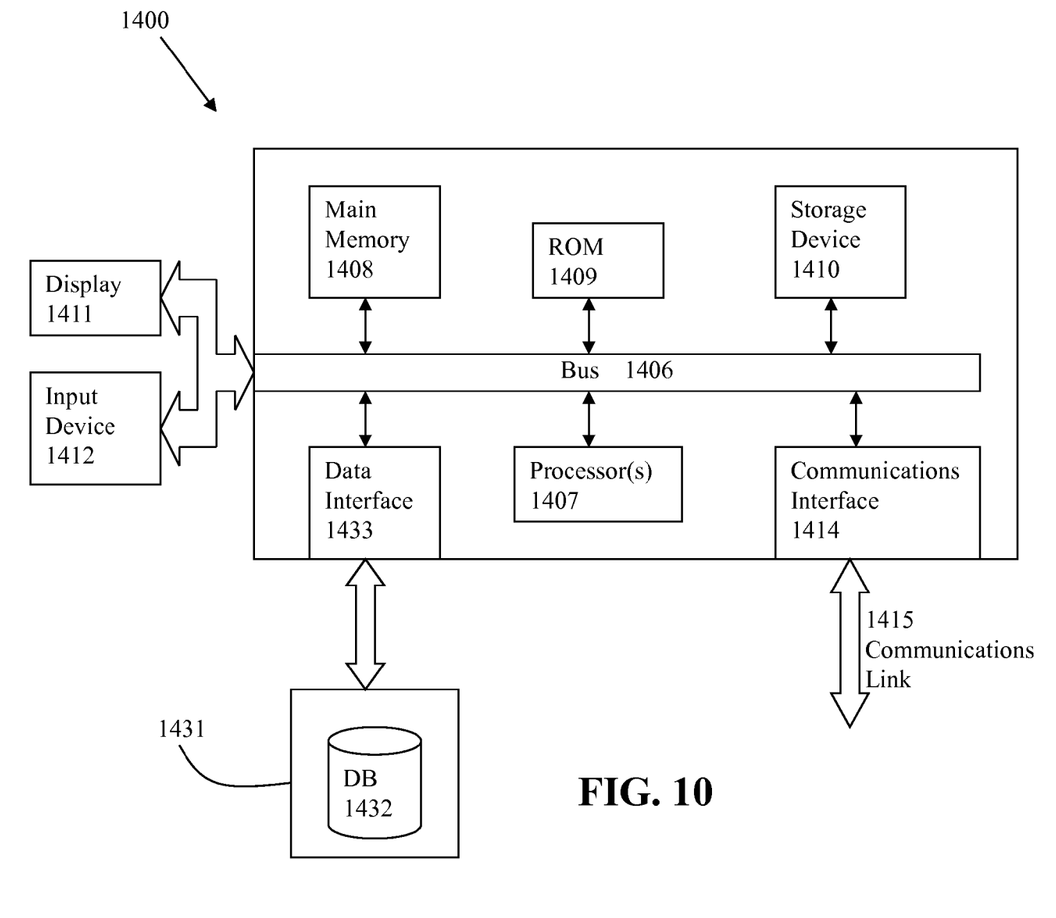
FIG. 10 is a block diagram of an illustrative computing system suitable for implementing an embodiment of the present invention for performing intrusion detection.

FIG. 10 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting network attacks in network traffic, comprising:
    generating an initial communication data flag which corresponds to a direction that a session was initiated, the session corresponding to communications between an internal host and an external host;
    detecting one or more rapid-exchange instances that correspond to the communications between the internal host and the external host;
    generating dormancy period data, the dormancy period data corresponding to a period of silence between a first rapid-exchange instance and a second rapid-exchange instance; and
    generating alarm data that indicates a network intrusion involving manual remote control, the alarm data generated based at least in part the initial communication data flag and the dormancy period data.

2. The method of claim 1, further comprising:
    generating session datasets from network traffic; and
    discarding session datasets that are not initiated by the internal host.

3. The method of claim 1, wherein the alarm data is generated based at least in part on the direction of an initial communication data flag.

4. The method of claim 1, wherein the alarm data is generated based at least in part on a direction threshold being exceeded, the direction threshold corresponding to an amount of data sent from the internal host to the external host and from the external host to the internal host.

5. The method of claim 1, wherein the alarm data is generated based at least in part on a initiator threshold being exceeded, the initiator threshold corresponding to a number of the rapid-exchange instances initiated by the external host compared to a number of the rapid-exchange instances initiated by the internal host.

6. The method of claim 1, further comprising:
    determining if two or more humans are involved in generating the one or more rapid-exchange instances; and
    discarding rapid-exchange instances that are determined to have been generated by two or more humans.

7. The method of claim 1, wherein the network traffic is received passively through a switch.

8. A system for detecting network attacks in network traffic, comprising:
    a computer processor to execute a set of program code instructions;
    a memory to hold the program code instructions, in which the program code instructions comprises program code to perform:
    generate an initial communication data flag which corresponds to a direction that a session was initiated, the session corresponding to communications between an internal host and an external host;
    detect one or more rapid-exchange instances that correspond to the communications between the internal host and the external host;
    generate dormancy period data, the dormancy period data corresponding to a period of silence between a first rapid-exchange instance and a second rapid-exchange instance; and
    generate alarm data that indicates a network intrusion involving manual remote control, the alarm data generated based at least in part the initial communication data flag and the dormancy period data.

9. The system of claim 8, in which the program code instructions further comprises program code to generate session datasets from network traffic; and discard session datasets that are not initiated by the internal host.

10. The system of claim 8, wherein the alarm data is generated based at least in part on the direction of an initial communication data flag.

11. The system of claim 8, wherein the alarm data is generated based at least in part on a direction threshold being exceeded, the direction threshold corresponding to an amount of data sent from the internal host to the external host and from the external host to the internal host.

12. The system of claim 8, wherein the alarm data is generated based at least in part on a initiator threshold being exceeded, the initiator threshold corresponding to a number of the rapid-exchange instances initiated by the external host compared to a number of the rapid-exchange instances initiated by the internal host.

13. The system of claim 8, in which the program code instructions further comprises program code to determine if two or more humans are involved in generating the one or more rapid-exchange instances; and discard rapid-exchange instances that are determined to have been generated by two or more humans.

14. The system of claim 8, wherein the network traffic is received passively through a switch.

15. A computer program product embodied on a non-transitory computer usable medium, the non-transitory computer readable medium having stored thereon a sequence of instructions which, when executed by a processor causes the processor to execute a method for detecting network attacks in network traffic, the method comprising:
    generating an initial communication data flag which corresponds to a direction that a session was initiated, the session corresponding to communications between an internal host and an external host;

detecting one or more rapid-exchange instances that correspond to the communications between the internal host and the external host;

generating dormancy period data, the dormancy period data corresponding to a period of silence between a first rapid-exchange instance and a second rapid-exchange instance; and generating alarm data that indicates a network intrusion involving manual remote control, the alarm data generated based at least in part the initial communication data flag and the dormancy period data.

16. The computer program product of claim 15, wherein the non-transitory computer readable medium further comprises instructions which, when executed by the processor, causes the processor to execute the method further comprising:

generating session datasets from network traffic; and discard session datasets that are not initiated by the internal host.

17. The computer program product of claim 15, wherein the alarm data is generated based at least in part on the direction of an initial communication data flag.

18. The computer program product of claim 15, wherein the alarm data is generated based at least in part on a direction threshold being exceeded, the direction threshold corresponding to an amount of data sent from the internal host to the external host and from the external host to the internal host.

19. The computer program product of claim 15, wherein the alarm data is generated based at least in part on a initiator threshold being exceeded, the initiator threshold corresponding to a number of the rapid-exchange instances initiated by the external host compared to a number of the rapid-exchange instances initiated by the internal host.

20. The computer program product of claim 15, wherein the non-transitory computer readable medium further comprises instructions which, when executed by the processor, causes the processor to execute the method further comprising:

determining if two or more humans are involved in generating the one or more rapid-exchange instances; and discarding rapid-exchange instances that are determined to have been generated by two or more humans.

21. The computer program product of claim 15, wherein the network traffic is received passively through a switch.

* * * * *